Feb. 28, 1967  N. W. BASSETT  3,306,994
SLIDE SWITCH WITH IMPROVED ACTUATING MEANS
Filed Oct. 21, 1964  2 Sheets-Sheet 2
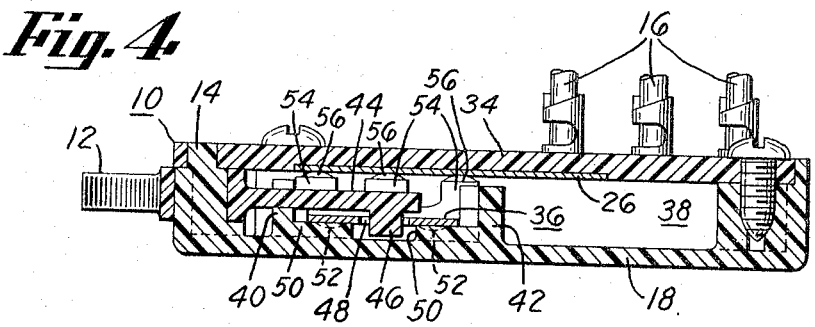
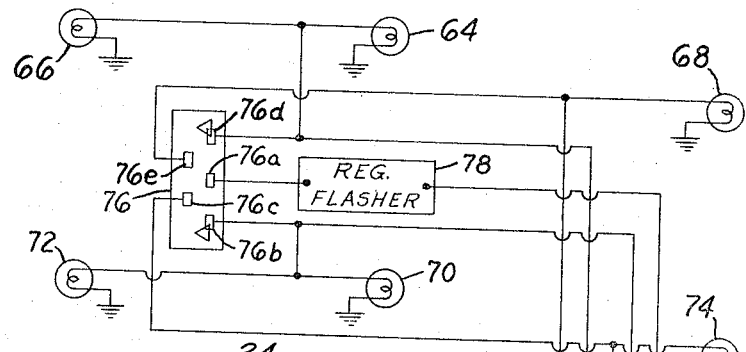
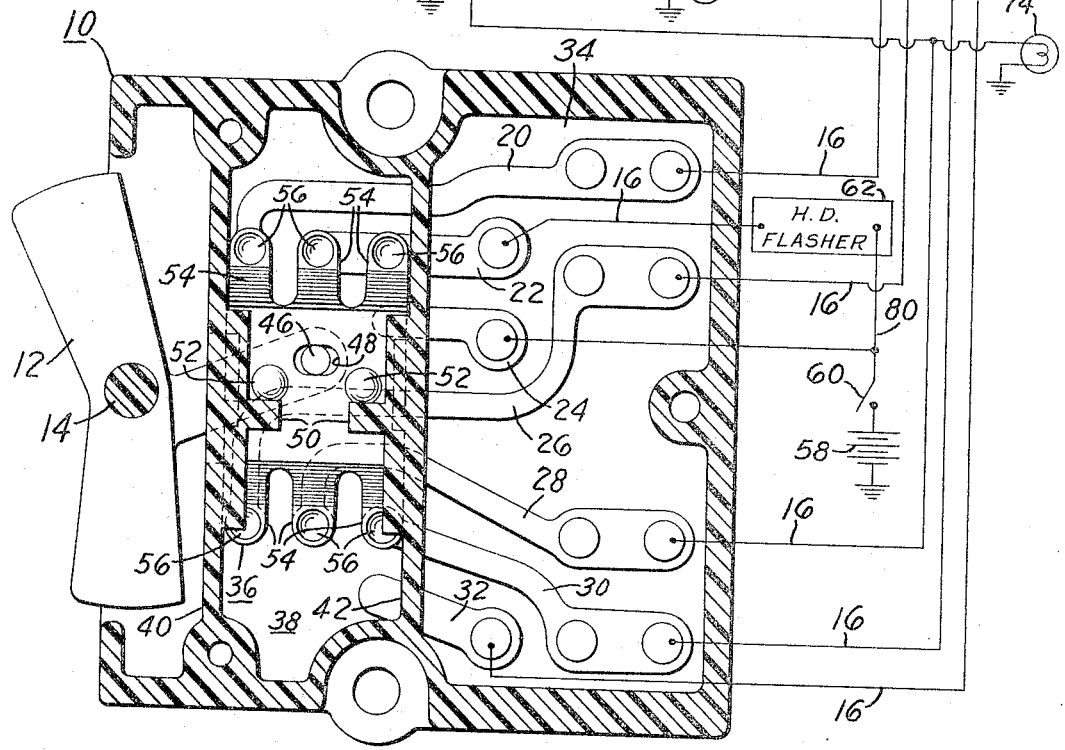
INVENTOR.
NORMAN W. BASSETT
BY Donald P. Sclurski
ATTORNEY

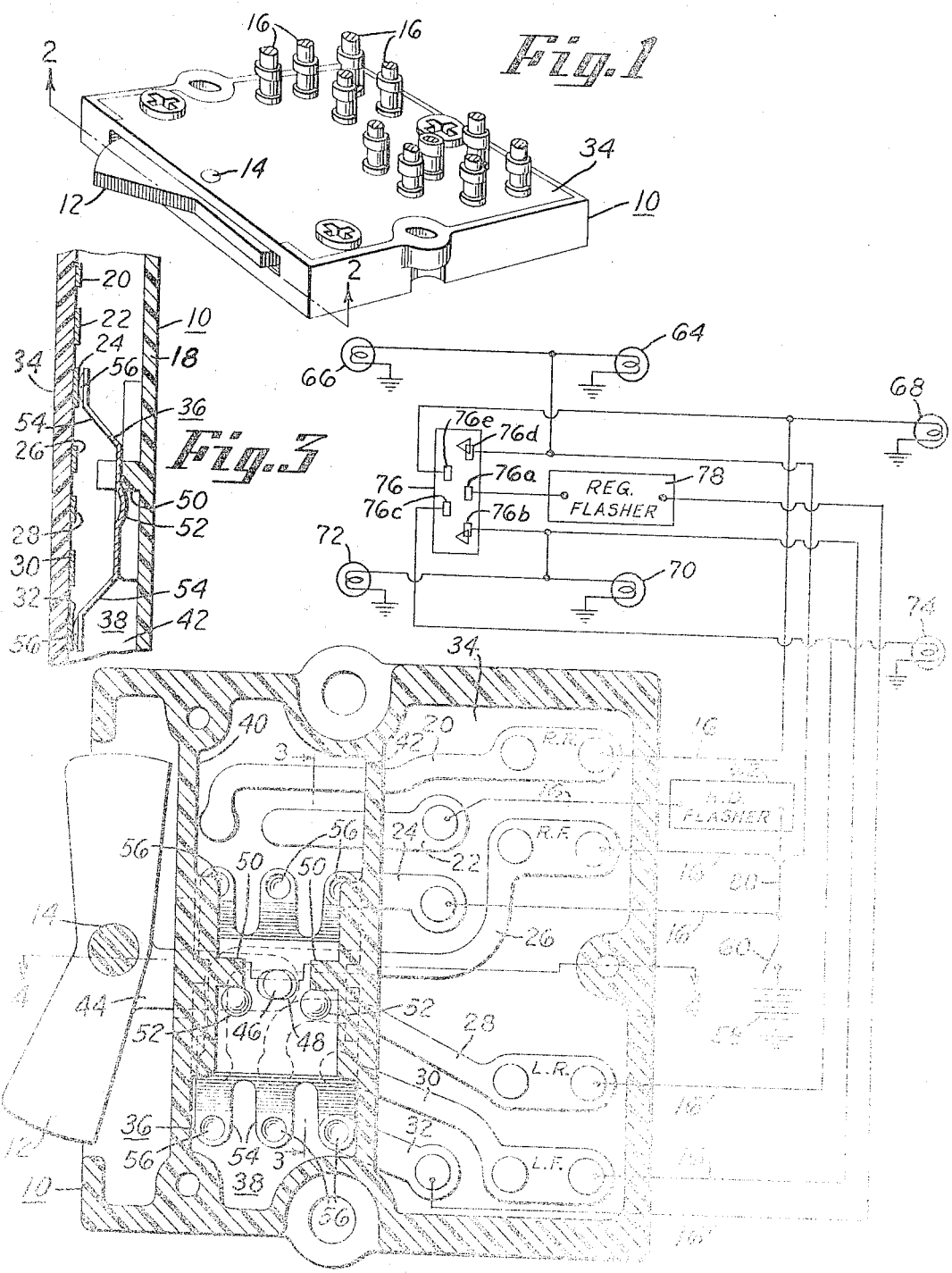

United States Patent Office 3,306,994
Patented Feb. 28, 1967

3,306,994
SLIDE SWITCH WITH IMPROVED ACTUATING MEANS
Norman W. Bassett, Knightstown, Ind., assignor to General Motors Corporation, Detroit, Mich., a corporation of Delaware
Filed Oct. 21, 1964, Ser. No. 405,527
3 Claims. (Cl. 200—16)

This invention relates to electrical switches and more particularly to a type of switch working in conjunction with a vehicle directional signalling system to cause the directional signal lamps of a vehicle to blink simultaneously.

It is desirable in the use of vehicles on limited access highways as well as roadways through relatively isolated areas to have a ready means of notifying passers-by of a need for help. It is also desirable, when a vehicle becomes disabled along a roadway, to have a means of indicating to oncoming motorists that a vehicle is parked and in distress. In this manner, travelers along a roadway are informed that a vehicle is parked near the traveled portion of the roadway and an accident between a moving and a parked vehicle is less likely. On limited access highways where attracting attention of passing motorists or police patrol cars is sometimes difficult, a means is provided for doing so.

It is an object of the present invention to provide an improved means for alerting motorists on a roadway of a vehicle parked near that roadway.

It is another object of the present invention to provide an improved means for alerting passing motorists of a vehicle in distress.

It is still another object of the present invention to provide an improved device that works in conjunction with a vehicle directional signalling apparatus to carry out the aforementioned objects.

It is a further object of the present invention to provide an electrical control, working in conjunction with a vehicle directional signalling system, which employs a regular flasher to indicate a turn of a vehicle and a heavy duty flasher to simultaneously flash all of the vehicle directional signalling lamps to indicate the position of a vehicle near a roadway.

It is still a further object of the present invention to provide an electrical switch that is shiftable into one position to bridge spaced contacts to make energizable a predetermined series of electrical circuits and which is shiftable into a second position to energize a plurality of electrical circuits.

Further objects and advantages of the present invention will be apparent from the following description, reference being had to the accompanying drawings wherein a preferred embodiment of the present invention is clearly shown.

In the drawings:-

FIGURE 1 is a perspective view of a switch used in conjunction with the subject invention;

FIGURE 2 is a sectional view taken along line 2—2 of FIGURE 1 with an electrical circuit diagrammatically shown as conductively engaging appropriate contacts in the switch body;

FIGURE 3 is a sectional view taken along line 3—3 of FIGURE 2;

FIGURE 4 is a sectional view taken along line 4—4 of FIGURE 2;

FIGURE 5 is substantially similar to FIGURE 2 with the switch shown in another actuated position.

Referring now to FIGURE 1, a switch body 10 is illustrated with an actuator 12 extending through one wall of the switch body and pivotally mounted at pivot point 14. Conductive elements 16 are shown passing through a wall 34 of the switch body 10 and engage electrically conductive strips in electrical circuits to be hereinafter described.

Referring now to FIGURE 2, a series of conductive strips 20, 22, 24, 26, 28, 30 and 32 are carried by a wall 34 of the switch body 10. The wall 34 is formed as an opposite side of the switch body 10 from the wall 18. It is understood that the conductive element 16 conductively engage the strips 20 through 32 in any well-known manner. The switch body 10 is formed on any appropriate conductive material so that the conductive strips 20 through 32, when positioned as illustrated in FIGURE 2, are electrically insulated from one another.

A contact element 36 is slidably disposed in a chamber 38 formed between a wall 40 and a wall 42 of the switch body 10. The walls 40 and 42 guide the contact element 36 during a sliding movement and serve as a support means for the switch body 10.

The actuator 12 has an extending arm portion 44 extending into chamber 38 and includes a lug 46 engaging a slot 48 formed in the contact element 36. It is therefore obvious that a pivoting of the actuator 12 on the pivot point 14 will result in a sliding movement of the contact element 36 in the chamber 38 due to the engagement of the lug 46 with the slot 48. A pair of flanges 50 formed as a portion of the wall 18 projects into the chamber 38 and are engaged by raised portions 52 formed on the contact element 36.

Referring now to FIGURE 3, the contact element 36 is seen to be a resilient member, formed of any well-known conductive material, that has downwardly extending leg portions 54 carrying contact points 56. The contact points 56 are so designed that, when the actuator 12 is appropriately positioned, the contact points 56 will overlay a predetermined combination of the conductive strips 20 through 32. The raised portions 52 of the contact element 36 are illustrated as being adjacent to the flanges 50 extending into the chamber 38 from the wall 18. When the actuator 12 is pivoted into either extreme of movement, the raised portions 52 will be depressed by the flanges 50 and eventually will move to the far side of the flanges 50 from where they were originally positioned. This passage of the raised portions 52 past the flanges 50 is made possible by the resilience of the contact element 36 and serves as a latching means for the subject switch when positioned in either extreme of movement of the actuator 12.

Referring now to FIGURE 2, the electrical system diagrammatically shown therein is of a common type used to provide a directional signal indication for a motor vehicle. A battery 58 provides power through an ignition switch 60 to the conductive strip 24 and to a heavy duty flasher unit 62. The flasher 62 is of a conventional type wherein a bimetallic element is alternatively heated and cooled in a conventional manner to make and break, in sequence, an electrical circuit between the power source 58 and any of a number of signal lamps. The heavy duty flasher 62 is conductively engaged by a conductive strip 22.

For purposes of illustration, it will be assumed that a lamp 64 is the right front directional signal lamp of a vehicle, a lamp 66 is a right turn indicating lamp of a vehicle located in the driver's compartment, and a lamp 68 is the right rear directional signal lamp of the vehicle. The corresponding series of lamps 70, 72 and 74, respectively, represent lamps for the left side of the vehicle. Each of the aforementioned lamps is connected through an appropriate lead 16 to one of the conductive strips 20, 26, 28 or 30. These lamps are also connected through appropriate electrical leads to a terminal box 76 which would be a directional signal control switch operated by a conventional directional signal control lever. A normal flasher 78 is connected between a terminal in the terminal box 76 and the conductive strip 32. An examination of the diagrammatic illustration in FIGURE 2 clearly shows that the indicating lamp and the directional signal indicating lamps for the same side of the vehicle work together and are powered through the same lead. The terminal box 76 includes a power terminal 76A which provides a power lead into the terminal box 76 through the normal flasher 78. When a left turn is to be indicated, terminal lead 76B, connected to the conductive strip 30 and to the turn indicating lamp 72 and the left turn signal lamp, is energized at the same time as the terminal 76C, electrically engaging the left rear turn lamp and the conductive strip 28, is energized. Therefore, the turn signal lever electrically connects the power terminal 76A with the terminals 76B and 76C to bring about a left turn indication. In like manner, terminal 76D, electrically connecting the turn indicating lamp 66 and the right front signal lamp 64 along with the conductive strip 26, is energized. At the same time, a terminal 76E, engaging the right rear turn signal lamp 68 and a conductive strip 20, is energized.

In addition, during either of the aforementioned turn signal indications, it is assumed that the actuator 12 is in the position indicated in FIGURE 2 where in the contact element 36 is positioned so as to bridge the conductive strip 32 and the conductive strip 24. As previously stated, the conductive strip 32 conductively engages the normal flasher 78 and the conductive strip 24 is in electrical engagement with a lead 80 from the battery 58 to the heavy duty flasher 62. It is apparent then that power is supplied to the terminal box 76 by bridging the conductor strips 32 and 24, which circuit is interruptible by the operation in a conventional manner of the normal flasher 78. Therefore, while the actuator 12 is in the position as shown in FIGURE 2, the turn signal system illustrated therein operates in the conventional manner.

The operation of the subject invention as a warning indicator is brought about by pivoting the actuator 12 into the position illustrated in FIGURE 5. In the conventional operation of the directional signal indicating system, power is supplied to the terminal box 76 by bridging the conductive strips 24 and 32. Power is provided in the emergency condition by bridging the conductive strips disposed within the switch body 10 and supplying power thereto through the heavy duty flasher 62. Referring to FIGURE 5, power is provided from a battery 58 through the ignition switch 60 and the lead 80 to the heavy duty flasher 62. One of the conductive elements 16 connects the heavy duty flasher 62 with the conductive strip 22. With the contact element 36 shifted upwardly, as viewed in FIGURE 5, the conductive strips 20, 22, 26, 28 and 30 are simultaneously bridged. Therefore, power through the conductive strip 22 is simultaneously distributed to the conductive strips 20, 26, 28 and 30 to and finally all of the lamps 64 through 74. The circuit thereby established is intermittently interrupted by the operation of heavy duty flasher 62 and all of the vehicle turn signalling lamps will blink.

It therefore becomes obvious that a shifting of the actuator 12 into one position causes an immediate blinking or flashing of all the vehicle directional signalling lamps, and shifting of the actuator 12 into another position readies the turn signalling system, described herein, for operation by the conventional turn signalling lever in a selective manner.

The switch body 10, carrying the conductive strips 20 through 32, the contact element 36 and the actuator 12, can be positioned in any convenient place within the driving compartment of a vehicle. The vehicle operator therefore can position the actuator 12 in the position desired under the appropriate operating condition.

While the embodiment of the present invention, as herein disclosed, constitutes a preferred form, it is to be understood that other forms might be adopted.

What is claimed is as follows:

1. An electrical switch comprising: a switch body; a series of fixed contacts carried on one wall of the switch body; a contact element having a plurality of contact points and slidably carried in another portion of the switch body; actuator means including a tiltable portion pivotally carried by the switch body and including an extending portion offset with respect to the pivot point of said actuator means arranged to engage said contact element to drive said contact element into several operative positions a greater distance than the pivoting distance of said actuator means; and latching means arranged to limit the sliding movement of said contact element in several positions wherein the contact points of said contact element align with several of the fixed contacts in a predetermined pattern to conductively bridge several of the fixed contacts.

2. An electrical switch according to claim 1 wherein the latching means is a plurality of extending members formed as a portion of the switch body and raised portions on said contact element adapted to engage said plurality of extending members thereby limiting the sliding movement of the sliding contact element at exactly the position in which a predetermined number of fixed contacts are bridged.

3. An electrical switch according to claim 2 wherein the contact element is a resilient conductive member having leg portions carrying the contact points and a support portion having raised portions formed therein for engaging the extending members of the switch body to limit sliding movement of said contact element.

References Cited by the Examiner
UNITED STATES PATENTS

| 2,725,432 | 11/1955 | Brown | 200—16 |
| 2,751,468 | 6/1956 | Brown et al. | 200—16 X |
| 2,880,284 | 3/1959 | Laete | 200—16 |
| 3,030,459 | 4/1962 | Elliot et al. | 200—16 X |

ROBERT K. SCHAEFER, Primary Examiner.

J. R. SCOTT, Assistant Examiner.